United States Patent
Fuhrmann et al.

(10) Patent No.: US 8,690,717 B2
(45) Date of Patent: Apr. 8, 2014

(54) TENSIONING RAIL FOR POWER TRANSMISSION DRIVES ON INTERNAL COMBUSTION ENGINES

(75) Inventors: Rainer Fuhrmann, Waischenfeld (DE); Thomas Ullein, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 193 days.

(21) Appl. No.: 13/183,774

(22) Filed: Jul. 15, 2011

(65) Prior Publication Data

US 2011/0294613 A1  Dec. 1, 2011

Related U.S. Application Data

(63) Continuation-in-part of application No. PCT/EP2009/066192, filed on Dec. 2, 2009.

(30) Foreign Application Priority Data

Jan. 15, 2009 (DE) .......................... 10 2009 004 618

(51) Int. Cl.
*F16H 7/08* (2006.01)

(52) U.S. Cl.
USPC .......................................... 474/111; 474/109

(58) Field of Classification Search
USPC ............................. 474/111, 109, 110
See application file for complete search history.

(56) References Cited

U.S. PATENT DOCUMENTS

| | | | |
|---|---|---|---|
| 4,832,664 A * | 5/1989 | Groger et al. ................. | 474/111 |
| 6,062,998 A * | 5/2000 | Kumakura et al. ............ | 474/111 |
| 6,612,952 B1 * | 9/2003 | Simpson et al. .............. | 474/111 |
| 6,758,777 B2 * | 7/2004 | Young ........................... | 474/140 |
| 6,980,277 B2 * | 12/2005 | Sewell .............................. | 355/30 |
| 7,137,916 B2 * | 11/2006 | Kurohata et al. ............. | 474/111 |
| 7,393,487 B2 | 7/2008 | Konno | |
| 7,850,559 B2 * | 12/2010 | Botez et al. ................... | 474/110 |
| 2002/0165056 A1 * | 11/2002 | Ullein .......................... | 474/110 |
| 2003/0050140 A1 * | 3/2003 | Konno .......................... | 474/111 |
| 2003/0139237 A1 * | 7/2003 | Konno et al. .................. | 474/111 |
| 2003/0144100 A1 * | 7/2003 | Konno .......................... | 474/111 |
| 2004/0058763 A1 * | 3/2004 | Konno .......................... | 474/111 |
| 2008/0287232 A1 * | 11/2008 | Botez et al. ................... | 474/110 |
| 2009/0029814 A1 * | 1/2009 | Schuseil ....................... | 474/111 |

FOREIGN PATENT DOCUMENTS

| | | |
|---|---|---|
| CN | 1407257 A | 4/2003 |
| DE | 197 09 476 A1 | 11/1997 |
| DE | 201 15 472 U1 | 2/2003 |
| DE | 20 2004 013 921 U1 | 1/2006 |
| EP | 1 291 553 A | 3/2003 |
| JP | 2004 116680 A | 4/2004 |

OTHER PUBLICATIONS

JP 2004116680 English Translation.*

* cited by examiner

*Primary Examiner* — William E Dondero
*Assistant Examiner* — Minh Truong
(74) *Attorney, Agent, or Firm* — Lucas & Mercanti, LLP

(57) ABSTRACT

A tensioning device for compensating for elongations of the traction mechanism, in particular a chain or a timing belt, of a power transmission drive, in particular on an internal combustion engine, having a tensioning mechanism, in particular a tensioning rail, a sliding shoe or tensioning arm having a tensioning roller. A tensioning element is disposed between a support surface on the tensioning mechanism and a support, in particular on the internal combustion engine, and the support surface on the tensioning mechanism is made of a material which has a high strength.

7 Claims, 4 Drawing Sheets

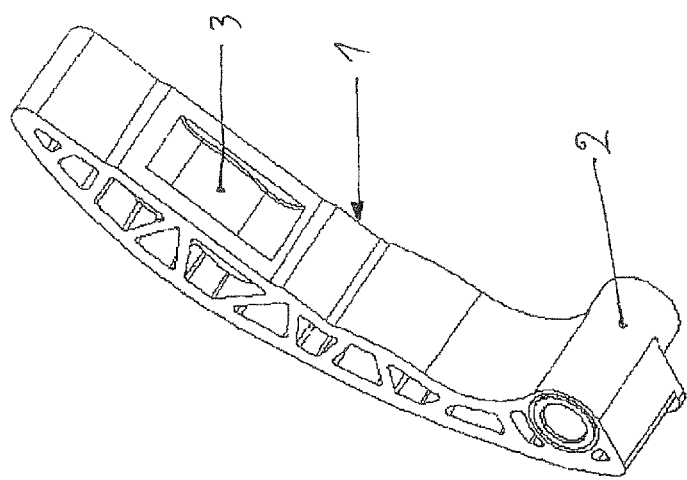
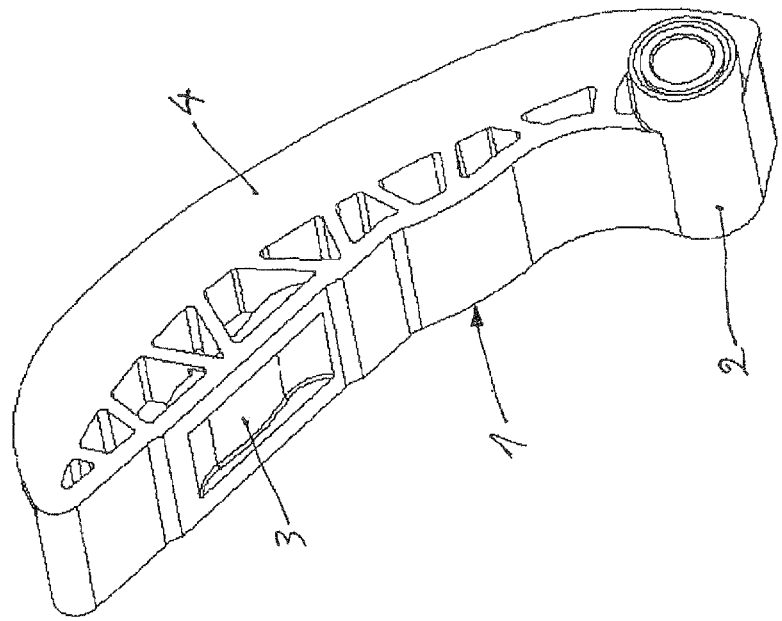

TENSIONING RAIL FOR POWER TRANSMISSION DRIVES ON INTERNAL COMBUSTION ENGINES

This application is a continuation in part of PCT/EP2009/066192 filed Dec. 2, 2009, which in turn claims the priority of DE 10 2009 004 618.6 filed Jan. 15, 2009. The priority of both applications is hereby claimed and both applications are incorporated by reference herein.

DESCRIPTION

1. Field of the Invention

A tensioning device for compensating for elongations of the traction element, in particular of a chain or a toothed belt of a traction element drive on an internal combustion engine.

2. Background of the Invention

DE 201 15 472 U1 discloses a tensioning device with a tensioning rail which is mounted pivotably at one end and, at a distance therefrom, has a support surface on which a tensioning element acts with the actuating piston thereof which, supported on a component of the internal combustion engine, loads the tensioning rail. In order to vary the forces applied to the traction element drive, said tensioning rail has two supporting surfaces which are arranged at a different distance from the pivot point.

This document does not discuss the problem that the support surface, which is produced from the same material as the tensioning rail, could be subject to increased wear.

DE 20 2004 013 921 U1 furthermore discloses a tensioning rail which is arranged within the traction element drive and has two side walls delimiting the through passage for the traction element. A thrust member is provided here, said thrust member being operatively connected to the two side walls and serving as a support surface for the tensioning element. The thrust member in said document serves to transmit the forces of the tensioning element to the two side walls, a problem involving wear of the thrust member not being discussed in this document either.

OBJECT OF THE INVENTION

It is the object of the invention to make available a tensioning means, in particular tensioning rail, in which the wear on the support surface in the region of contact with the tensioning element is considerably reduced. Furthermore, the tensioning means, in particular the tensioning rail, is to be producible cost-effectively and suitable for large scale manufacturing.

SUMMARY OF THE INVENTION

The object is addressed by the invention for a tensioning device, which has a tensioning means, in particular a tensioning rail, a sliding shoe or a tensioning arm with a tensioning roller, with a support and a tensioning element, in particular a chain or a toothed belt, arranged between the support surface on the tensioning means and a support on the internal combustion engine, in that the support surface on the tensioning means is produced from a material which has a high strength. The material of the support surface is intended to be matched to the actuating component of the tensioning element with regard to compressive strength and/or wear resistance and/or hardness.

The proposed support surface can be fastened to the tensioning element arbitrarily. For example, it may be designed as a separate component and interlocked to the tensioning element or fastened to the tensioning means in the manner of a clip. It may also be adhesively bonded thereon.

However, the support surface is preferably produced integrally with the tensioning means, wherein the material of the support surface is injected into the mould during the production of the tensioning means or into a cavity after production of said tensioning means. In particular glass fiber reinforced plastic which has high wear and abrasion resistance is recommended as the material.

The support surface is therefore intended to have a higher strength than the material for the tensioning means, since the material for the tensioning means is intended to be selected in accordance with the flexibility criteria.

The effect achieved in particular by the proposed measures is that different materials can be selected for the basic body of the tensioning means and for the support surface, and therefore a tensioning means, in particular a tensioning rail, which can be optimally adapted to the application is made available.

The support surface, as is known per se, is designed in a manner corresponding to a cylinder surface, and therefore the surface of the support surface is oriented perpendicularly to the tension element irrespective of the position of the tensioning means.

The invention can be defined as:

1. A tensioning device for compensating for elongations of the traction element, in particular of a chain or a toothed belt, of a traction element drive, in particular on an internal combustion engine, with a tensioning means, in particular tensioning rail, sliding shoe or tensioning arm with a tensioning roller, wherein a tensioning element is arranged between a support surface on the tensioning means and a support, in particular on the internal combustion engine, characterized in that the support surface on the tensioning means is produced from a material which has a high strength.
2. The tensioning device in item 1, characterized in that the material of the support surface is matched to the actuating component of the tensioning element with regard to compressive strength and/or wear resistance and/or hardness.
3. The tensioning device in items 1 or 2, characterized in that glass fiber reinforced plastic is provided as the material.
4. The tensioning device in one of the preceding items, characterized in that the support surface is produced integrally with the tensioning means.
5. The tensioning device in item 4, characterized in that the material of the support surface is injected during the production of the tensioning means.
6. The tensioning device in one of the preceding items, characterized in that the material of the support surface is injected into a cutout provided therefor after the production of the tensioning means.
7. The tensioning device in one of the preceding items, characterized in that the material of the support surface has a higher strength than the material for the tensioning means.
8. The tensioning device in one of the preceding items, characterized in that the material of the tensioning means is selected, inter alia, in accordance with the flexibility criterion.

BRIEF DESCRIPTION OF THE DRAWINGS

To further explain the invention, reference is made to the drawings in which an exemplary embodiment of the invention is illustrated in simplified form. In the drawings:

FIG. 1 shows a perspective view of a tensioning rail with a view of the support surface;

FIG. 2 shows the perspective view of FIG. 1 from a different viewing direction;

DETAILED DESCRIPTION OF THE DRAWINGS

Figure 3:
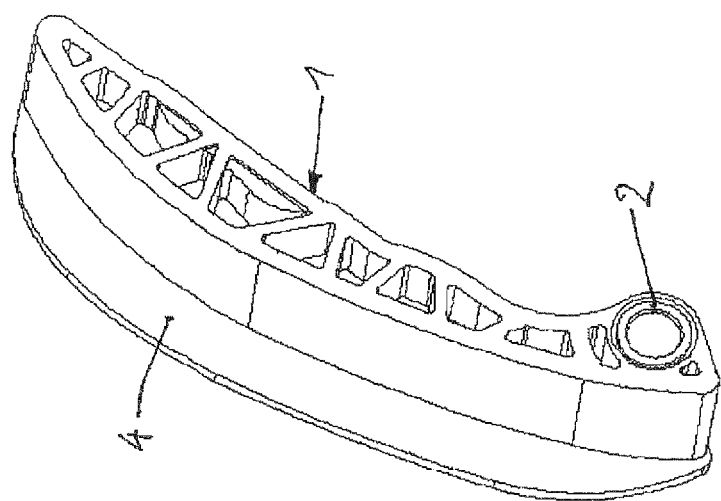
FIG. 3 shows a further perspective view of the tensioning rail.
Figure 4:
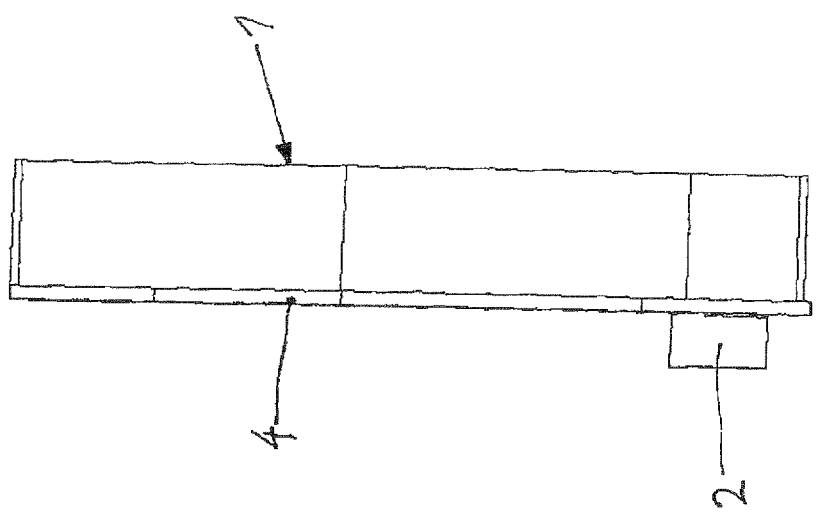
FIG. 4 shows a side view of the tensioning rail.
Figure 5:
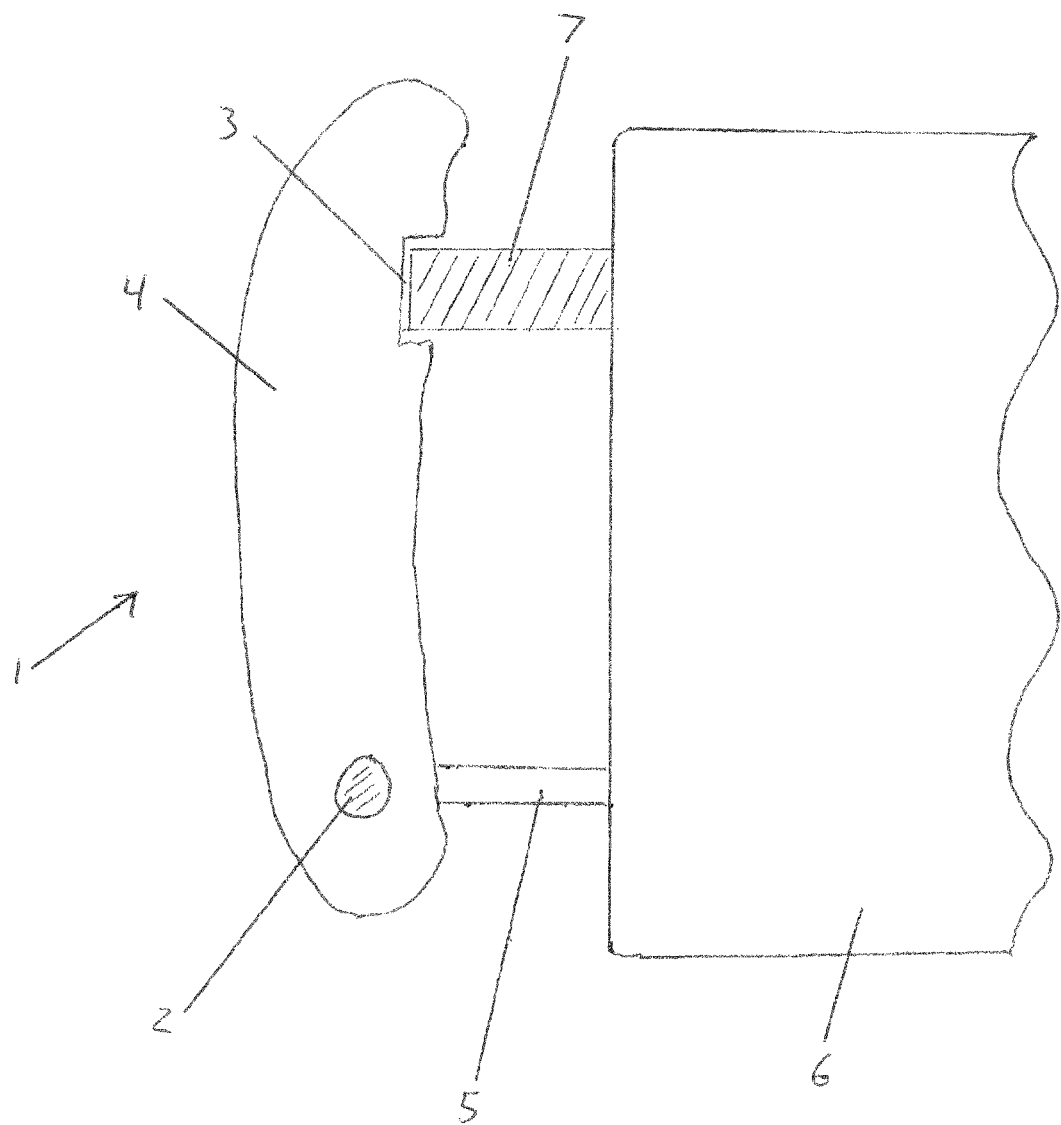
FIG. 5 shows a partial side view of an assembly of the tensioning rail with an internal combustion engine.
Figure 6:
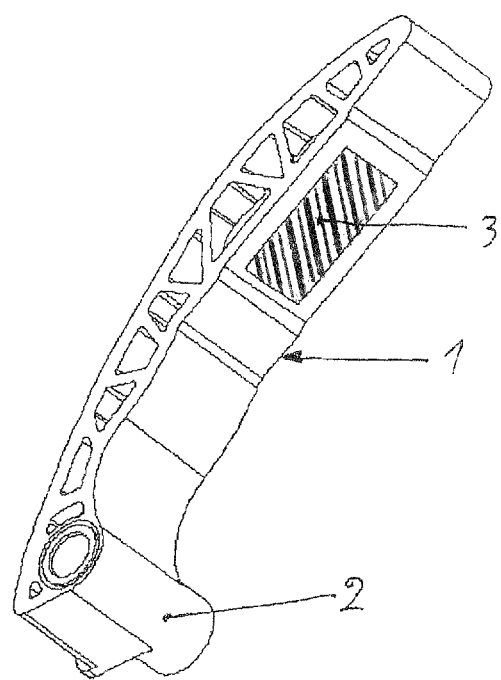
FIG. 6 shows a perspective view of the tensioning rail with the contact surface filled with material.

In FIGS. 1 to 6, a tensioning rail is denoted by 1, when illustrated individually, the tensioning rail has, at one end thereof, an integrally formed bearing sleeve 2 which is operatively connected to a bolt 5 arranged on the internal combustion engine 6 or on a component of the internal combustion engine 6. The tensioning rail 1 is mounted pivotably about the axis thereof with a tensioning element 7 spaced from the bolt 5 and mounted on the internal combustion engine 6. At a distance from the bearing sleeve 2, the tensioning rail 1 has a support surface 3. The support surface 3 is produced from a material of higher strength, for example of glass fiber reinforced plastic. As shown in FIG. 6, the support surface 3 can be injected with material. The support surface 3 may be injected retrospectively into a cutout of the tensioning rail or it may be injected into the mould at the same time as the tensioning rail is produced. The support surface 3 in both cases is connected fixedly to the tensioning rail 1. A side wall, which is denoted by 4 and improves the guidance of the traction element on the tensioning rail 1, is integrally formed on the tensioning rail 1. The tensioning rail 1, which has recesses and struts for reducing the weight, can be produced, without taking the strength of the support surface into consideration, from a material which can be selected so as to comply with the demands imposed on the tensioning rail 1, in particular in accordance with flexibility aspects.

LIST OF REFERENCE NUMBERS

1 Tensioning Rail
2 Bearing Sleeve
3 Support Surface
4 Side Wall

The invention claimed is:

1. A tensioning device for compensating elongations of a traction element of a traction element drive for an internal combustion engine, comprising:
   an elongated tensioning device for tensioning a traction element, one side of the tensioning device having a surface for contacting the traction element and the other side of the tensioning device having a support surface which is produced from a material with a high strength,
   wherein the support surface is an inset and formed integrally with the tensioning device, the material of the support surface being injected during production of the tensioning device such that the material of the support surface is permanently coupled with the tensioning device; and
   a tensioning element contacting the support surface and loading the tensioning device against the traction element, the tensioning element arranged between the support surface on the tensioning device and a support on the internal combustion engine, wherein the material of the support surface has a higher strength than a material of a remainder of the tensioning device.

2. The tensioning device as claimed in claim 1, wherein the traction element is a chain or a toothed belt.

3. The tensioning device as claimed in claim 1, wherein the tensioning device is a tensioning rail, a sliding shoe or a tensioning arm with a tensioning roller.

4. The tensioning device as claimed in claim 1, wherein the material of the support surface is matched to the actuating component of the tensioning element with regard to compressive strength and/or wear resistance and/or hardness.

5. The tensioning device as claimed in claim 1, wherein the material of the support surface is glass fiber reinforced plastic.

6. The tensioning device as claimed claim 1, wherein the tensioning device has a cutout and the support surface is made from a material injected into the cutout.

7. The tensioning device as claimed in claim 1, wherein the tensioning device is required to meet a predetermined flexibility and the material of the remainder of the tensioning device is selected so that the tensioning device meets the required flexibility.

\* \* \* \* \*